(12) United States Patent
Kataria et al.

(10) Patent No.: US 7,925,550 B2
(45) Date of Patent: Apr. 12, 2011

(54) SYSTEM AND METHOD FOR MANAGING A REGULATED INDUSTRY

(75) Inventors: Anjali Rani Kataria, San Francisco, CA (US); Kamlesh Rashmi Desai, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1645 days.

(21) Appl. No.: 10/914,538

(22) Filed: Aug. 9, 2004

(65) Prior Publication Data

US 2005/0015166 A1 Jan. 20, 2005

Related U.S. Application Data

(63) Continuation of application No. 10/052,412, filed on Jan. 23, 2002, now abandoned.

(60) Provisional application No. 60/263,177, filed on Jan. 23, 2001.

(51) Int. Cl.
*G06F 9/44* (2006.01)
*G06F 19/00* (2006.01)
*G06Q 10/00* (2006.01)
*G05B 15/00* (2006.01)

(52) U.S. Cl. .................. 705/28; 705/7; 700/83; 700/95; 700/99

(58) Field of Classification Search .................. None
See application file for complete search history.

(56) References Cited

U.S. PATENT DOCUMENTS

| | | | |
|---|---|---|---|
| 3,896,659 A | 7/1975 | Goodman | |
| 5,664,112 A | 9/1997 | Sturgeon et al. | |
| 5,712,990 A | 1/1998 | Henderson | |
| 5,831,859 A | 11/1998 | Medeiros et al. | |
| 5,847,957 A | 12/1998 | Cohen et al. | |
| 6,014,729 A | 1/2000 | Lannan et al. | |
| 6,067,549 A * | 5/2000 | Smalley et al. | 707/104.1 |
| 6,243,615 B1 * | 6/2001 | Neway et al. | 700/108 |
| 6,256,640 B1 | 7/2001 | Smalley et al. | |
| 6,324,522 B2 | 11/2001 | Peterson et al. | |
| 6,345,259 B1 * | 2/2002 | Sandoval | 705/7 |
| 6,397,115 B1 * | 5/2002 | Basden | 700/83 |
| 6,401,085 B1 * | 6/2002 | Gershman et al. | 707/4 |
| 6,458,595 B1 | 10/2002 | Selinfreund | |
| 6,567,788 B1 | 5/2003 | Johnson, Jr. | |
| 6,741,998 B2 | 5/2004 | Ruth et al. | |

(Continued)

FOREIGN PATENT DOCUMENTS

EP 0612039 A3 2/1994

(Continued)

OTHER PUBLICATIONS

International Search Report and Written Opinion dated May 16, 2008 for International Application No. PCT/US07/24020.

(Continued)

*Primary Examiner* — F. Ryan Zeender
*Assistant Examiner* — Faris Almatrahi
(74) *Attorney, Agent, or Firm* — Kilpatrick Townsend & Stockton LLP

(57) ABSTRACT

A system and a method enable supply chain solutions for regulated industries. The embodiments facilitate regulatory and tax compliance management integrated with smart inventory and e-warehouse management solutions. The embodiments are applicable to heavily regulated industries such as, for example, beverages, food, oil, pharmachemicals, and chemicals.

89 Claims, 7 Drawing Sheets

U.S. PATENT DOCUMENTS

| | | | |
|---|---|---|---|
| 6,853,920 B2 | 2/2005 | Hsiung et al. | |
| 6,865,509 B1 | 3/2005 | Hsiung et al. | |
| 6,873,914 B2 | 3/2005 | Winfield et al. | |
| 6,904,370 B1 | 6/2005 | Levinson et al. | |
| 6,917,845 B2 | 7/2005 | Hsiung et al. | |
| 6,947,866 B2 | 9/2005 | Staab | |
| 6,985,779 B2 | 1/2006 | Hsiung et al. | |
| 6,988,109 B2 | 1/2006 | Stanley et al. | |
| 7,031,778 B2 | 4/2006 | Hsiung et al. | |
| 7,123,978 B2 | 10/2006 | Hartman et al. | |
| 7,131,069 B1 | 10/2006 | Rush et al. | |
| 7,146,231 B2 | 12/2006 | Schleiss et al. | |
| 7,174,230 B2 | 2/2007 | Arackaparambil et al. | |
| 7,206,646 B2 | 4/2007 | Nixon et al. | |
| 7,233,834 B2 | 6/2007 | McDonald et al. | |
| 7,275,070 B2 | 9/2007 | Kataria et al. | |
| 7,487,182 B2 | 2/2009 | Kataria et al. | |
| 7,797,327 B2 | 9/2010 | Kataria et al. | |
| 7,801,689 B2 | 9/2010 | Kataria et al. | |
| 7,801,777 B2 | 9/2010 | Kataria et al. | |
| 2001/0049595 A1 | 12/2001 | Plumer et al. | |
| 2001/0049615 A1* | 12/2001 | Wong et al. | 705/8 |
| 2001/0049673 A1 | 12/2001 | Dulong et al. | |
| 2002/0078217 A1 | 6/2002 | Thomas et al. | |
| 2002/0083364 A1 | 6/2002 | Christensen et al. | |
| 2002/0111888 A1 | 8/2002 | Stanley et al. | |
| 2002/0123957 A1 | 9/2002 | Notarius et al. | |
| 2002/0134456 A1 | 9/2002 | Soehnien et al. | |
| 2002/0143673 A1* | 10/2002 | Hitchings et al. | 705/30 |
| 2002/0165806 A1 | 11/2002 | Kataria et al. | |
| 2002/0188465 A1 | 12/2002 | Gogolak et al. | |
| 2003/0004608 A1 | 1/2003 | O'Dougherty et al. | |
| 2003/0028420 A1 | 2/2003 | DeBlasse | |
| 2003/0050868 A1 | 3/2003 | Hoffman et al. | |
| 2003/0093295 A1 | 5/2003 | Lilly et al. | |
| 2003/0141358 A1 | 7/2003 | Hudson et al. | |
| 2004/0186795 A1 | 9/2004 | Taylor et al. | |
| 2004/0190369 A1 | 9/2004 | Cosman et al. | |
| 2004/0210473 A1 | 10/2004 | Goddard | |
| 2004/0236463 A1 | 11/2004 | Weselak et al. | |
| 2005/0015166 A1 | 1/2005 | Kataria et al. | |
| 2005/0038565 A1 | 2/2005 | Power et al. | |
| 2005/0067425 A1 | 3/2005 | Bartholomew et al. | |
| 2005/0158798 A1 | 7/2005 | Sher | |
| 2005/0160077 A1 | 7/2005 | Howes | |
| 2005/0197786 A1 | 9/2005 | Kataria et al. | |
| 2005/0216383 A1* | 9/2005 | Kuhn et al. | 705/34 |
| 2005/0237213 A1 | 10/2005 | Teller | |
| 2005/0246223 A1 | 11/2005 | Roth et al. | |
| 2005/0251278 A1 | 11/2005 | Popp | |
| 2007/0185759 A1 | 8/2007 | Kataria et al. | |
| 2007/0192715 A1 | 8/2007 | Kataria et al. | |
| 2008/0091291 A1 | 4/2008 | Roy et al. | |
| 2008/0133294 A1 | 6/2008 | Kataria et al. | |

FOREIGN PATENT DOCUMENTS

| | | |
|---|---|---|
| EP | 0965897 A1 | 12/1999 |
| GB | 2347234 A | 2/2000 |
| WO | WO 03075206 A2 | 9/2003 |
| WO | WO 2004-072868 A1 | 8/2004 |

OTHER PUBLICATIONS

Anjali Kataria, 2001, U.S. Appl. No. 60/263,177, entitled "Method and Apparatus for Providing Supply-Side Chain Management Solutions," filed Jan. 23, 2001.

PJB Pulications Ltd. "A Tour of Pharmaprojects", Pharmaprojects Web/CD-Rom Version 5, 2003, pp. 1-40.

U.S. Appl. No. 11/022,316, filed Dec. 23, 2004, Final Office Action dated Apr. 6, 2007, 15 pages.

U.S. Appl. No. 11/022,316, filed Dec. 23, 2004, Notice of Allowance dated Jul. 25, 2007, 7 pages.

U.S. Appl. No. 11/022,316, filed Dec. 23, 2004, Office Action dated Aug. 4, 2006, 12 pages.

U.S. Appl. No. 11/430,680, filed May 8, 2006, Notice of Allowance dated Dec. 15, 2008, 7 pages.

U.S. Appl. No. 11/430,680, filed May 8, 2006, Office Action dated Jun. 26, 2008, 16 pages.

U.S. Appl. No. 11/824,812, filed Jul. 3, 2007, Final Office Action dated Mar. 27, 2009, 24 pages.

U.S. Appl. No. 11/824,812, filed Jul. 3, 2007, Notice of Allowance dated May 18, 2010, 5 pages.

U.S. Appl. No. 11/824,812, filed Jul. 3, 2007, Office Action dated Jul. 10, 2008, 23 pages.

U.S. Appl. No. 11/824,812, filed Jul. 3, 2007, Office Action dated Aug. 19, 2009, 6 pages.

U.S. Appl. No. 11/859,725, filed Sep. 21, 2007, Notice of Allowance dated May 5, 2010, 7 pages.

U.S. Appl. No. 11/859,725, filed Sep. 21, 2007, Office Action dated Nov. 30, 2009, 5 pages.

U.S. Appl. No. 11/633,048, filed Nov. 30, 2006, Notice of Allowance dated May 17, 2010, 7 pages.

U.S. Appl. No. 11/633,048, filed Nov. 30, 2006, Office Action dated Oct. 30, 2009, 8 pages.

U.S. Appl. No. 12/857,787, filed Aug. 17, 2010, Office Action dated Nov. 10, 2010, 6 pages.

* cited by examiner

SYSTEM AND METHOD FOR MANAGING A REGULATED INDUSTRY

PRIORITY APPLICATION

The present application claims priority to Provisional Application No. 60/263,177, entitled "METHOD AND APPARATUS FOR PROVIDING SUPPLY-SIDE CHAIN MANAGEMENT SOLUTIONS," filed Jan. 23, 2001, the entire contents of which are hereby incorporated by reference.

TECHNICAL FIELD

This invention relates to management of regulated industries. In particular, the present invention facilitates regulatory, tax compliance, inventory and e-warehouse management of regulated industries.

BACKGROUND

Heavily regulated and process oriented industries such as oil, food, beverage, chemicals, cosmetics and pharmaceuticals share a number of common characteristics: they are highly regulated; their content is either dynamically changing or very complex; they are subject to large fines for non-compliance; they are heavily process oriented; they require extensive record keeping; they have complex order tracking; they require indirect goods/input goods; and they have low visibility of process inputs. Currently there are no broad web-based solutions that fully meet needs of record keeping in process management of heavily regulated industries. In fact, many of the record keeping functions and filing processes for federal and state regulations still occur through outdated manual time-consuming means.

As an example, compliance in the wine industry begins as soon as the grapes reach the winery. This necessitates wineries to track where the grapes were grown, how they were shipped to the winery and the tonnage used throughout production, bottling and aging. This process can go on for many years. In addition, alcohol content during fermentation and the bottling/aging process must be tracked. Since a winery's ability to comply with the multitude of regulations hinges on capturing specific information throughout the continuous production process which is also tied to inventory, it is integral that compliance be tied into the winery's supply chain management.

This above problems are primarily due to the lack of industry-specific solutions that integrate regulatory compliance with inventory management. As a result, the production process is fragmented, labor intensive, inefficient, and expensive—resulting in a very high cost of goods sold, (averaging about 50-80% of net revenues) and high general and administrative costs (averaging 10-35% of net revenues). Regulatory compliance issues and the in-process inventory in the wine industry create a need for tailored supply chain solutions.

Wineries today also have limited visibility into their internal operations, with little real-time information of their wine in process inventory levels. The wine making side of the industry often lacks the ability to report how many bottles of a certain type of wine that they have in their cellar. They also find it difficult to match production levels with inventory needs, resulting in inefficient buying. Bulk wine supply is also difficult to manage.

Wineries often enjoy preferred supplier relationships formed by verbal agreements with favorable pricing terms. However, they seldom have centralized or consolidated purchasing among their subsidiaries resulting in varying pricing agreements. They regard their ingredients, supplier lists, and their recipes as proprietary information requiring high levels of security. Also, wineries have limited technology staff, thus requiring greater external hands-on support.

Known DOS/PC based products that focus on one particular need of the wine industry do not address the problems described above. Known systems: lack total supply chain management solutions; do not provide complete regulation and tax compliance management; licensing on a per seat basis; and have limited ability to provide visibility into internal operations, in particular they lack real time accessibility to all employees of the company.

As a result of the above problems in the wine industry, everything from inventory management, regulatory and tax compliance, and order fulfillment on the supply side is fragmented both inside and outside the enterprise, labor intensive, inefficient, and expensive. Regulatory and tax compliance is manual, complex and time consuming; suppliers and buyers lack visibility; parent companies have little real time information on the buy and spend categories of their subsidiaries; and there is little coordination between supplier production and buyer demand. As a result of such problems, the cost of goods sold in the wine industry averages 50-80% of net revenues, and general and administrative costs are often as high as 10-35% of net revenues.

SUMMARY OF THE INVENTION

According to an embodiment, embodiments of a system and a method are described that will enable supply chain solutions for regulated industries. The embodiments facilitate regulatory and tax compliance management integrated with smart inventory and e-warehouse management solutions. The embodiments are applicable to heavily regulated industries such as, for example, beverages, food, oil, pharmachemicals, and chemicals.

A first embodiment allows regulatory compliance integrated with complete, real time web-based supply chain infrastructure customized to the industry providing: a regulatory and tax database with automated compliance and tax reporting; inventory in process management for the tracking of grapes, their harvest and their juice through the production process; bulk wine management overall inventory management generating visibility into inventory levels and operations; content management for industry-specific or company-specific information; online catalog management for supplier offerings; private marketplaces exchange, procurement, shipping management, demand and forecasting tools, wireless applications, and regulatory e-filings in future releases.

The first embodiment provides industry-specific solutions to regulatory and tax compliance issues, including integrated industry-specific, supply chain applications to assist in compliance. Therefore, while there are other backend office and supply chain management solution providers, they are not, for example, wine-industry specific, nor do they focus on the regulatory and compliance issues, which are integral to any beverage company's supply chain. The first embodiment architecture is designed to operate alongside existing systems to provide complimentary applications.

The first embodiment enables users to manage regulatory filings, tax compliance, inventory—and correspondingly their warehouse. This aspect reduces supply chain inefficiencies with a real-time, web-based, enterprise-wide supply chain infrastructure. This aspect achieves a substantial reduction of the current cumbersome paper trail, but they afford users more accurate and timely compliance, thus avoiding violations and substantial fines/penalties.

The first embodiment may provide supply chain solutions to increase visibility throughout a regulated industry's operations. This aspect enables greater information management through secure access to real time information; and advanced planning. This aspect provides users worry-free management while reducing costs, inventory levels, and decreasing working capital needs. The embodiment can be wireless ready, enabling the user to more efficiently and effectively manage critical data.

Through an extremely thin, lightweight, and scalable platform, the first embodiment can perform real time web-based regulatory and tax compliance based supply chain infrastructure.

The first embodiment can also provide regulatory and tax compliance, inventory management, content management and supplier catalog management modules. Private marketplaces exchange, procurement, shipping management, demand and forecasting tools and regulatory e-filings will complement the supply chain solutions.

The first embodiment can interface with many third party enterprise resources planning applications and existing legacy systems. The system can be java-based, using open API systems, and can be highly scalable, flexible, robust, modular and portable (PDA and wireless capable). The system can use thin client architecture requiring only a web browser. The system can be implemented without requiring desktop installation. The system can support Secure Sockets Layer (SSL) to protect the transmission of content between the browser and the server. In addition, user identification and password protections will be embedded as well as controls based upon user roles.

Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
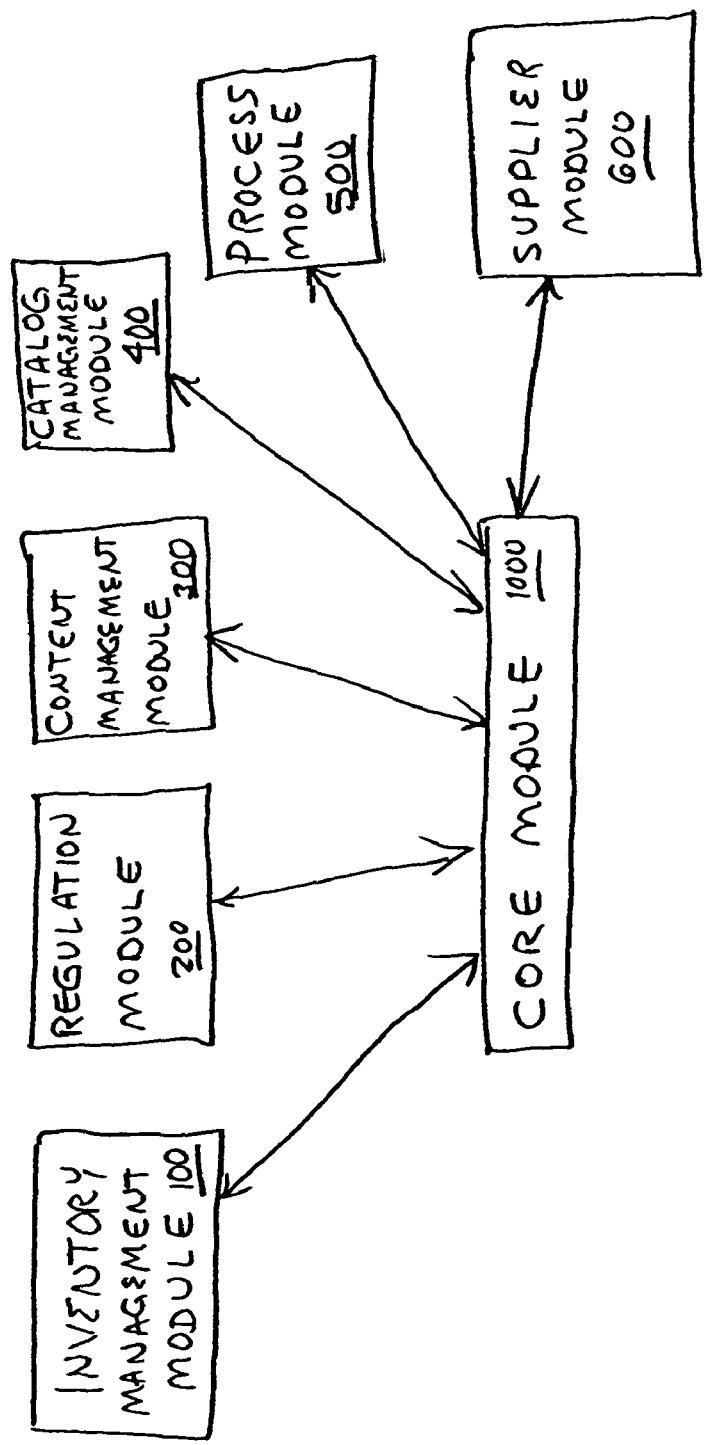
FIG. 1 is a block diagram of a system according to a first embodiment.

FIG. 1 is a block diagram of a system 5 according to a first embodiment. The system 5 comprises an inventory management module 100, a regulation module 200, a content management module 300, a catalog management module 400, a process module 500, a supplier module 600, and a core module 1000.

The inventory management module 100 includes domain knowledge of the wine industry to specifically address the needs of the wine industry. The needs addressed are: the movement of unlabeled grapes and juice and their differing values as they move through the production process, the tracking of harvests, and spoilage factors. In addition, the inventory management module 100 provides visibility into a company's inventory at the subsidiary or corporate level, as well as track the inventory through the winemaking process. The inventory management module 100 implements inventory threshold levels and reorder points and triggers a notification via email, pager or WAP. The inventory management module 100 will provide the ability for both the winery and their supplier with views into internal inventory levels. The inventory management module provides for the following functions: receipt and issue of goods; movement of goods; and verification of goods locations.

The regulation module 200 addresses the need for compliance with complex and varied federal and state regulations for alcohol production. The regulation module 200 will provide the most current regulatory and tax compliance information affecting the wine industry. This regulatory and tax database will also include automated compliance and tax reporting. The regulation module 200 will be linked with the Federal Drug Administration (FDA), Bureau of Alcohol Firearms and Tobacco (BATF), state agencies, and other on-line sources of legal information to create this database.

The content management module 300 is a relational database of industry-specific, company-specific or supplier-specific information such as: industry news, documents, inventory alerts, key weather and farming data.

Suppliers that sell products typically have some sort of catalog, whether it be online or in hardcopy. The catalog management module 400 provides the winery with a consolidated view of similar products across a number of suppliers.

The process module 500 captures data from various stages of wine production. The captured data can include activity records or lab analyses records. The records allow traceability for audit and regulatory compliance.

The supplier module 600 provides the ability to manage suppliers and the associated catalog.

The core module 1000 is the base module for the system 5. The core module 1000 implements the functionalities of the system 5. Functionalities of the core module 1000 include: user management, roles and security management, organization structure management, system administration, functional master, alert functionality.

Figure 2:
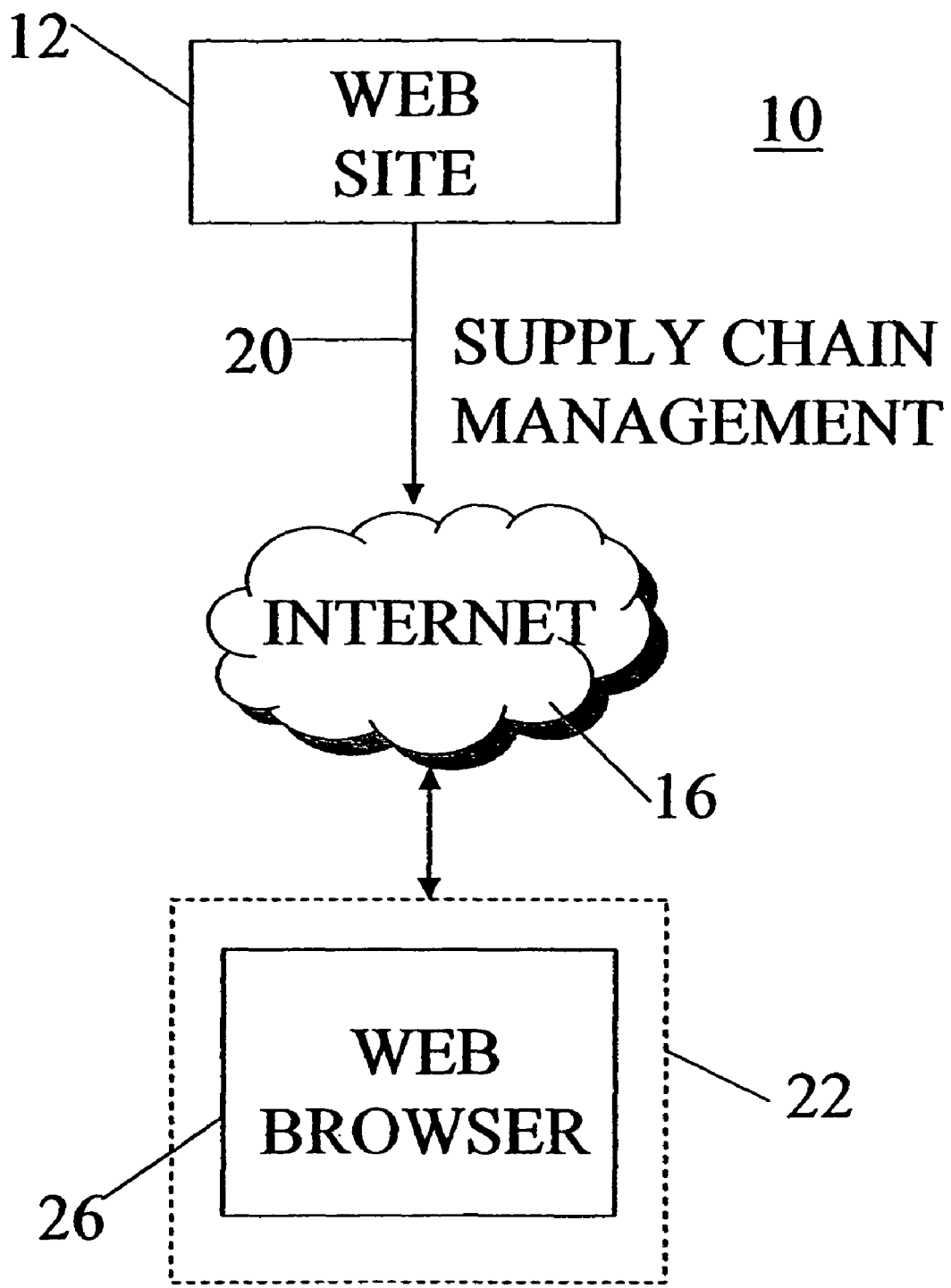
FIG. 2 is a diagram illustrating operation of an embodiment of a supply-side chain management application.
Figure 3:
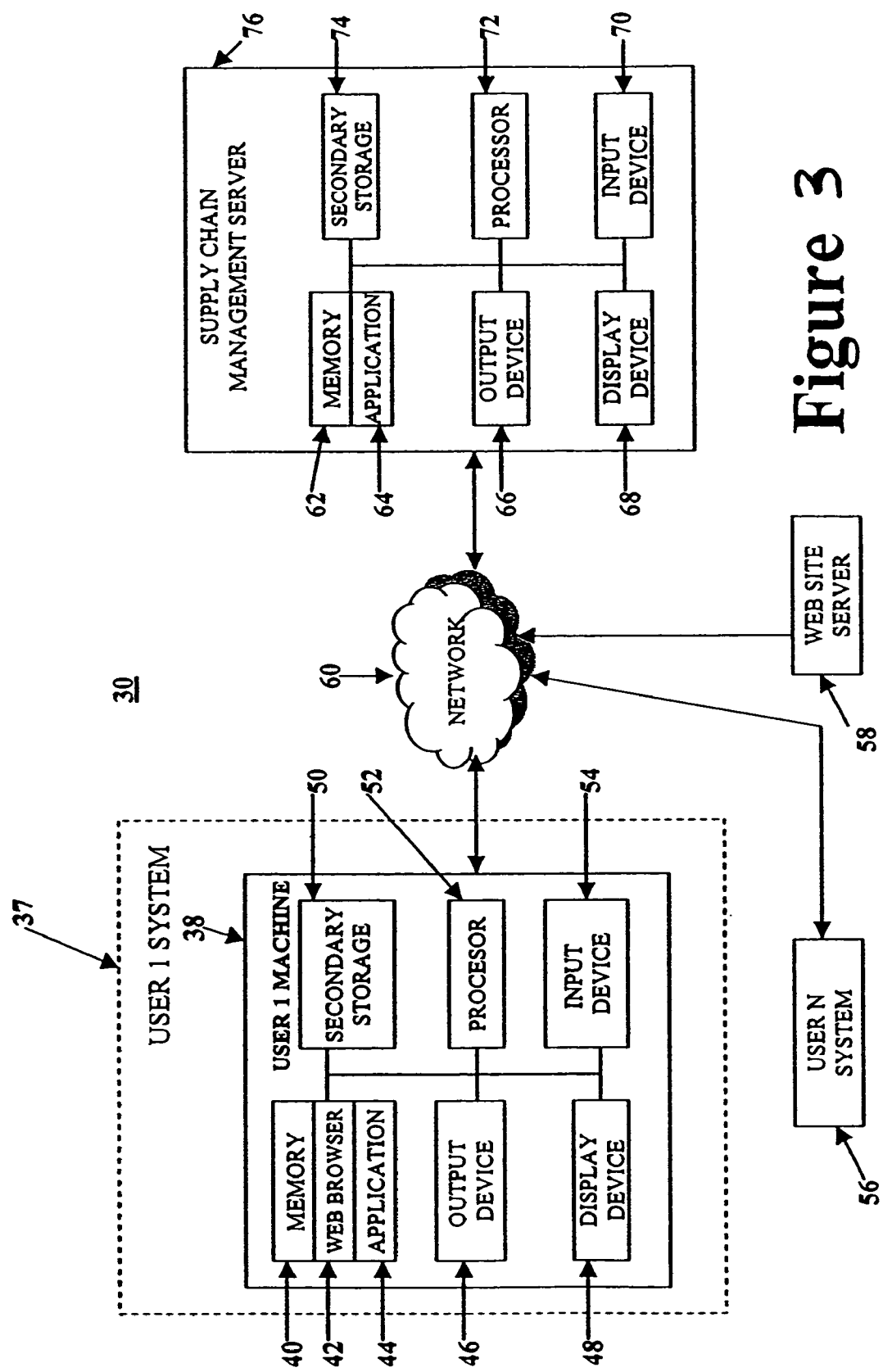
FIG. 3 is a block diagram illustrating hardware components for implementing a web based supply-side chain management application.

FIG. 2 is a diagram conceptually illustrating operation of an embodiment consistent with the present invention to provide infrastructure that will enable supply chain solutions for regulated industries. The supply chain solution 10 is used with a web-site 12, which represents one or more applications through which users can engage in worry-free management of their inventory, production, etc. A user with system 22 may interact with web-site 12 on-line (or otherwise) using a web browser 26 communicating through a network connection such as the Internet 16 or other type of network in order to obtain information about the status of their, for example, production FIG. 3 is a block diagram illustrating exemplary hardware components for implementing system 10 for enabling supply chain solutions for regulated industries. System 30 includes a user system 37 having a user machine 38 connected with a network 60 such as the Internet, providing a network connection for participating in IP ordering. Other user systems, such as user system 56 may also be connected with network 60 for obtaining production status. User system 56, and other user systems, may include the same components as user system 37.

Users at user systems 37 and 56 interact with a server 76 to obtain production status information. Server 76 provides and maintains the web site 12 for providing a network connection to the application(s) through which users can obtain and share information. System 30 may also include the ability to access one or more web site servers 58 in order to obtain content from the World Wide Web, if desired. Only two user systems are shown for illustrative purposes only; system 30 may include many user machines and may be scalable to add or delete user machines to or from the network.

User machine 38 illustrates typical components of a user machine. User machine 38 typically includes a memory 40, a secondary storage device 50, a processor 52, an input device 54, a display device 48, and an output device 46. Memory 40 may include random access memory (RAM) or similar types of memory, and it may store one or more applications 44, and a web browser 42, for execution by processor 52. Secondary storage device 50 may include a hard disk drive, floppy disk drive, CD-ROM drive, or other types of non-volatile data storage. Processor 52 may execute applications or programs stored in memory 40 or secondary storage 50, or received from the Internet or other network 60. Input device 54 may include any device for entering information into machine 38, such as a keyboard, mouse, cursor-control device, touch-screen, microphone, digital camera, video recorder or camcorder. Display device 48 may include any type of device for presenting visual information such as, for example, a computer monitor or flat-screen display. Output device 46 may include any type of device for presenting a hard copy of information, such as a printer, and other types of output devices include speakers or any device for providing information in audio form.

Web browser 42 is used to access the application(s) through the web site 12 and display various web pages through which the user can collaborate information, and examples of those web pages are described below. Examples of web browsers include the Netscape Navigator program and the Microsoft Internet Explorer program. Any web browser, co-browser, or other application capable of retrieving content from a network and displaying pages or screens may be used.

Examples of user machines for interacting with the web site 12 include personal computers, laptop computers, notebook computers, palm top computers, network computers, or any processor-controlled device capable of executing a web browser or other type of application for interacting with the system.

Server 76 typically includes a memory 62, a secondary storage device 74, a processor 72, an input device 70, a display device 68, and an output device 66. Memory 62 may include RAM or similar types of memory, and it may store one or more applications 64 for execution by processor 72. Secondary storage device 74 may include a hard disk drive, floppy disk drive, CD-ROM drive, or other types of non-volatile data storage. Processor 72 executes the application(s), which is stored in memory 62 or secondary storage 74, or received from the Internet or other network 60. Input device 70 may include any device for entering information into server 76, such as a keyboard, mouse, cursor-control device, touch-screen, microphone, digital camera, video recorder or camcorder. Display device 68 may include any type of device for presenting visual information such as, for example, a computer monitor or flat-screen display. Output device 66 may include any type of device for presenting a hard copy of information, such as a printer, and other types of output devices include speakers or any device for providing information in audio form.

Also, processor 72 may execute one or more software applications 64 in order to provide the functions described in this specification, and the processing may be implemented in software, such as software modules, for execution by computers or other machines. The processing may provide and support web pages described in this specification and otherwise for display on display devices associated with the users' computers. The term "screen" refers to any visual element or combinations of visual elements for displaying information or forms; examples include, but are not limited to, user interfaces on a display device or information displayed in web pages or in windows on a display device. The screens may be formatted, for example, as web pages in HyperText Markup Language (HTML), Extensible Markup Language (XML) or in any other suitable form for presentation on a display device depending upon applications used by users to interact with the system.

The screens include various sections, as explained below, to provide information or to receive information or commands. The term "section" with respect to screens refers to a particular portion of a screen, possibly including the entire screen. Sections are selected, for example, to enter information or commands or to retrieve information or access other screens. The selection may occur, for example, by using a cursor-control device to "click on" or "double click on" the section; alternatively, sections may be selected by entering a series of keystrokes or in other ways such as through voice commands or use of a touch screen. In addition, although the screens described below illustrate a particular arrangement and number of sections in each screen, other arrangements are possible and different numbers of sections in the screens may be used to accomplish the same or similar functions of displaying information and receiving information or commands. Also, the same section may be used for performing a number of functions, such as both displaying information and receiving a command.

Although only one server is shown, system 30 may use multiple servers as necessary or desired to support the users and may also use back-up or redundant servers to prevent network downtime in the event of a failure of a particular server. In addition, although machine 37 and server 76 are depicted with various components, one skilled in the art will appreciate that these machines and the server can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as machine 37 and server 76, to perform a particular method.

Figure 4:
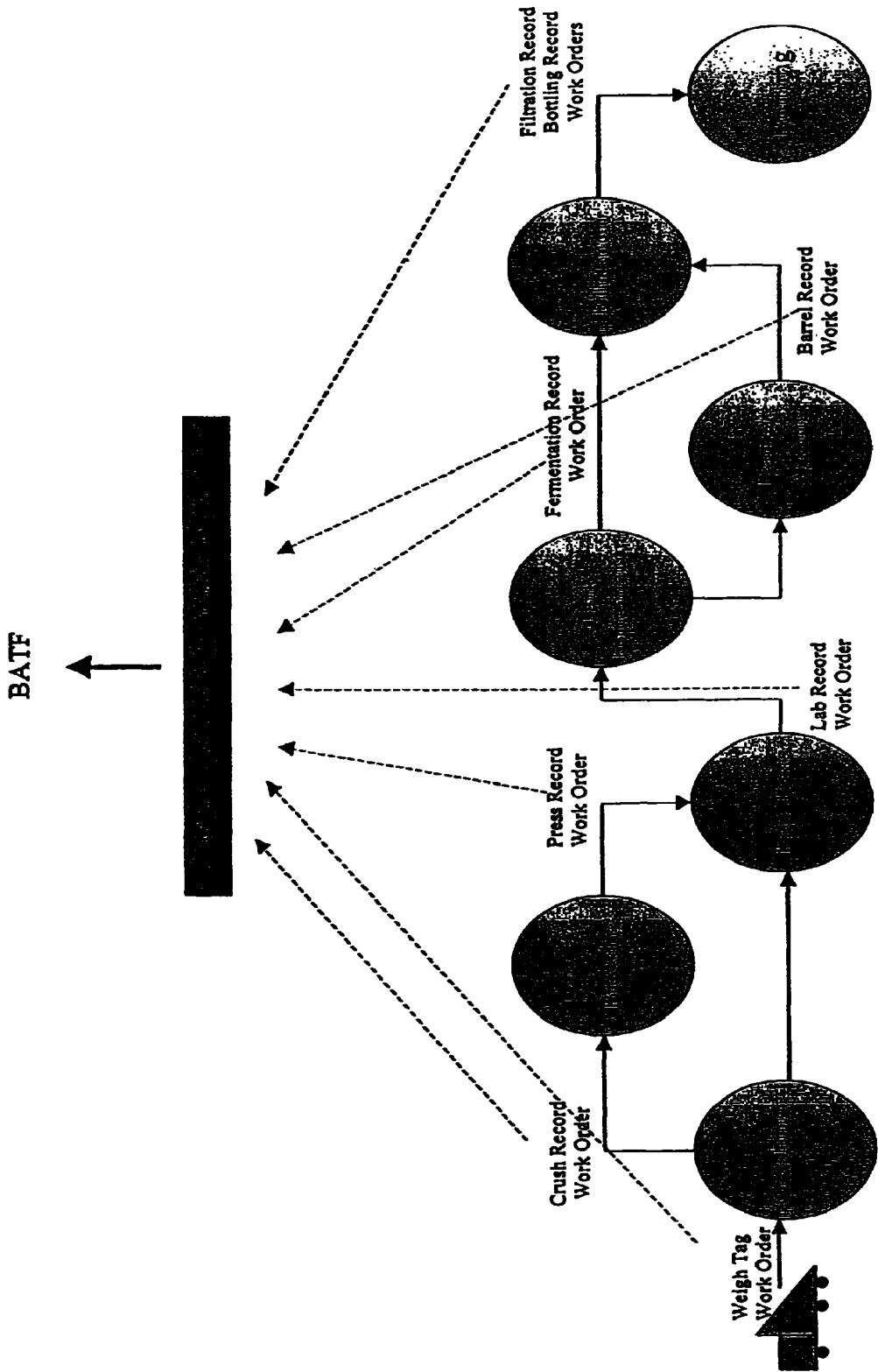
FIG. 4 is a diagram of a regulated industry and its process.

FIG. 4 is an example of a regulated industry (e.g., the wine industry) and how not only is the process modeled, but data points such as various records and work orders are fed into an electronic filing system which can automatically generate or electronically file compliance reports and other regulatory documents. Other applicable industries include: food, pharmaceuticals, petroleum, chemical, etc. The process, which is modeled here, is an actual instance whereas the present application can support and be configured for any process flow. Also, the system can be audited in reverse to facilitate in audits by regulatory bodies or for internal needs. The entire process is captured in a web-based software system. In addition, wireless software captures this process in industrial wireless devices.

Example

1 Introduction

RivaCommerce, Inc (Riva) was founded in May 2000 and plans to provide enterprise wide supply chain management solutions for the global beverage industry. Riva is an application service provider (ASP) of supply chain management solutions focusing on building smart inventory and warehouse management solutions which integrate complex functions such as regulatory and compliance management.

The initial focus for the next two years will be the global wine industry, but Riva's model is applicable to any heavily regulated industry. By enabling its customers to manage their inventory and warehouse, Riva's web-based supply chain solutions offer enormous opportunities to increase visibility and make more informed operational decisions through secure access to real time information.

The beverage industry as a whole, is still largely using legacy systems. One of the greatest challenges this industry faces is managing the complex regulatory and compliance process alongside the production of beverages in the legacy environment. Riva Commerce is well positioned to be the dominant technology provider in a potentially very large market segment where there has been little automation.

Riva Commerce has partnered with Wipro Technologies (Wipro) for building the supply chain solution. This document is the result of the study conducted by Wipro to understand the product requirements.

2 System Overview 2.1 Introduction

The beverage industry as a whole is still largely using legacy systems. One of the greatest challenges this industry faces is managing the complex regulatory and compliance process alongside the production of beverages in the legacy environment. The proposed product should address some of these primary issues and scale up at a later date to provide a comprehensive solution for the wine industry.

2.2 Issues

The following are few of the important issues faced by the wine industry, which the proposed product is expected to solve:

1. Currently, a lot of wineries do not have a consolidated view of their inventory position across all locations. This is primarily because of lack of integration across primitive IT systems used by the winery. The proposed product will provide a snap shot view of the inventory position across all locations.

2. The purchasing department does not have a consolidated view of the inventory position and hence are unable to initiate purchasing at the right time. The proposed system would provide a mechanism for each user to set up thresholds based on which alerts can be sent.

3. The weak area in most wineries today is in record keeping for regulatory compliance. In small wineries, the records are maintained in ledgers. Since this is a manual process and record keeping of each process is done separately, tracing the entire cycle from grapes to wine becomes difficult.

4. The regulatory authority requires all wineries to furnish periodic data in a standard format. It becomes extremely difficult for the wineries to get the required data to prepare the regulatory documents. Some of the large wineries have appointed external consultants to do the job. The proposed product plans to leverage on the data generated by the inventory and process modules to generate regulatory documents.

5. Wineries are highly regulated and there is need to have adequate trace ability from wine to grapes. This is a very important feature especially during audits. The product has to provide features that would help to trace from wine to grape through the production process.

6. Wineries have a large number of suppliers who supply bottles, corks, barrels and such other materials that go into the making of wine. Currently, the supplier records are maintained manually in ledgers. This makes it difficult to pick the right supplier when there is a need. The proposed product has to keeps track of suppliers and catalog electronically.

7. There is a lot of information exchange that happens between the employees of the winery, their suppliers, label making agencies etc. Currently, these interactions happen over phone, fax and email. Once these interactions happen, there is no trace of it. The proposed product should have facility to share documents within and outside the organization.

2.3 Modularity

The proposed product has to be modular for the following reasons:

1. Different customers may decide to purchase one or more modules depending on budget and functional constraints.

2. The product would be enhanced by adding additional modules over a period of time.

The following are the various modules of the proposed system. A brief description of the requirements is provided. The requirements are discussed in depth in the subsequent chapters.

2.3.1 Core Module

The core module is the underlying module for the entire system. The core module implements functionality common across the entire product. The set of functionality that is required in the core module are:

User Management

Roles and Security Management

Organization Structure Management

System Administration

Functional masters like Item Master and Supplier Master

Alert Functionality 2.3.2 Process Module

The process module captures data emanating from various stages of wine production. The data captured may be activity records or lab analysis records. These records play a critical part in implementing trace ability that is required for audit and regulatory compliance.

2.3.3 Inventory Module

The inventory module provides the ability to a customer to manage inventory. The following functionality is envisaged as part of this module:

Good Receipt and Issue

Movement of goods

Physical Verification 2.3.4 Supplier Module

The supplier module provides the ability to manage suppliers and the associated catalog. The following functionality is envisaged as part of this module:

Managing supplier information

Managing catalog information

2.3.5 Content Module

The content module would contain the required functionality for managing content. The content can be News articles Industry briefs Riva Commerce updates The content module would provide the facility for users to post and share content with other users either within or outside the organization. This functionality is helpful to share label related documents with creative team and product related documents with suppliers.

2.3.6 Regulation Module

The regulation module would provide the required functionality for regulatory compliance. It would have the facility to generate statutory reports as per BATF requirements.

2.4 Integrated Solution

The application architecture would be such that the process, inventory, supplier, content and regulation modules can work independently or work as a cohesive lot, if all the modules were purchased, integration across these modules would be possible.

2.5 Context Based Help

The functionality to support context based help would be provided. Each help page would be identified with a unique code. The content of the help page has to be setup during initial implementation. From each of the web pages, the user can navigate to the help page. The help page is context sensitive which implies, it would be relevant to the web page from which the user navigates. All web pages would have a corresponding help page. Two or more web pages may share a common help page.

2.6 Alerts

The user is kept informed of various system events through alerts. Alerts help to draw attention of the user to various events, which is of interest to him.

2.6.1 Registration

The user should have the facility to register for the various kinds of alerts that are triggered by the system. For example, if it is a news alert, he should be able to specify his areas of interest.

2.6.2 Delivery of Alerts

Alerts can be delivered through multiple channels:

A. On the web site after login

B. Through email

C. Through SMS messaging

The exact nature and content delivered through the various channels will be finalized during product consulting.

2.7 Reports

The following are the various kinds of reports that have to be supported by the system:

1. Administrative reports
2. Functional reports

3 Core Module

3.1 Introduction

The core module is the underlying module for the entire system. The core module implements functionality common across the entire product. The core module provides the underlying infrastructure for the rest of the modules.

3.2 Conceptual Design

The product is envisaged to have two distinct user interfaces.

1. Configuration interface
2. Functional interface.

While the configuration side will handle setting up the product for use, the functional side is broken up into modules that are masters and transactions.

3.3 Configuration Interface

The configuration interface would house modules to support the configuration elements. These functionalities will enable the Riva Commerce implementation and administrative team to set up the system for its client in an ASP mode. Also in the case of the system being owned by Riva Commerce's client, the key users from the client organization would be responsible for managing the configuration.

The key users who are authenticated into the system will have access to the following modules based on the access rights set-up by the administrator.

The configuration interface will allow the users a functional way of configuring without knowing technical aspects of the codes, etc).

The various modules are:

1. Global Configuration
2. Functional Configuration

3.3.1 Global Configuration:

These are the basic configuration elements, which will be set up by the user initially. The parameters that will be configured here are currency, language, countries, states, UOM, etc. The above parameters once configured will enable the system to function smoothly on the functional side.

3.3.2 Functional Configuration:

The functional configuration area will be split as per the modules in the functional side. All the parameters and drop down menus are to be configured in this space. For example, numbering ranges of records, activities in the work-order, location, buyer code, item category, tank numbers, barrel numbers, lot numbers, composition, vintage, etc.

Typical set of configurations required during setup is explained below:

1. Activities: The wine making process flow contains various activities like Receiving, CrushingiDesteming, Fermentation, Desteming, Rack and Clear, Fine and Stabilizing, Filtering, Bottling and others. These activities will be configured to form inputs to the transaction where work-order activity details are recorded. This will enable a single work-order format to serve recording of all activities in the wine making process.

2. Number Ranges: Each items in the item master, suppliers in the supplier master, Lots and documents in the process management module will have a unique number which will be generated internally.

3. The item master configuration elements are Item Category, Vintage, Buyer codes, physical inventory verification type, number of levels of catalog, hierarchy etc.

Items are grouped into categories. The categories may or may not be hierarchical. The facility to create and manage categories has to be supported by the system. A category typically has a name, description and a parent identifier. Inventory data can then be queried based on the category.

Vintage represents the year of the harvest of grapes and the configuration element should provide for years in the form of 1998, 1999, 2000 etc. Such vintage figures will be picked up during the creation of lots on receipt of grapes.

Buyer code is the userid of the person responsible for purchasing. Allocation of a buyer code to an item in the item master not only will facilitate querying on inventory data based on a buyer code but also will be able to restrict viewing of information based on the code.

Composition configuration will provide opportunity for the user to create varietal and appellation of grapes in the item master with percentages. For example; varietal—cabernet (100%), appellation—Cabernet (Dry Creek 80% & Napa 20%).

4. The supplier master configuration elements are the categories, which can be hierarchical and will provide the ability to drill down, when the catalog is presented.

5. Locations represent physical demarcations of areas where the tanks or barrels are located.

6. The functional modules will require configuration for creation of tank numbers, barrel numbers, service status and groups.

The tank numbers and barrel numbers are used to identify the tank or barrel uniquely.

Service Status provides information of the barrel in terms of whether in use or empty.

3.4 Functional Interface

The functional interface will house the various modules comprising masters and transactions. The masters is a central repository for data. Transaction module permits users within the winery for performing the various functions. Users will be accessing this section of the system after authenticating through a login/password. The user will then be able to perform the relevant, tasks to which he has been given access.

3.4.1 User Management

The user management module in the system is to be used for creating, editing and deleting users and roles. It is also used to grant and revoke permissions.

1. The system will provide a user interface to capture all the users of their details in the form of Name, Title, Phone No., Fax No., Email, Location, Department, etc. The location, department etc, will map them into the organizational structure of the winery. The system will provide a drill down representation of users based upon the org. structure. The key system administrators will use this functionality to locate users within the system in order to monitor, edit or delete their details.

2. The user will be provided with a user id and password using which he can log on to the system. The user will have the facility to change the password.

3. The system will provide an interface to create, edit and delete roles in the system with access rights at a granular level within the module. The rights will be that of create, edit and view type at a granular level within a module. The access rights will be configurable for a certain period as well. A detailed description of a particular role will be available on selection of a role.

4. Each user can be assigned a role from within the system with default access rights. The access rights set-up for a user here are modifiable and will supersede the access rights of the role.

5. The facility to group users has to be supported. Addition and removal of users in a group is possible from the system.

6. The groups set up by the administrator would appear in the inventory management (alerts) and content management (document sharing) modules.

7. Users will have the ability to create his own groups. These groups are applicable only to that user.

8. The granularity of access control will be as follows:
Module (E.g. inventory function
Transaction (E.g. inventory status)
Rights (Add, modify, delete)
Data Bound (E.g. inventory item x, document y)

Module: Access can be granted selectively to few modules. Wineries may buy selective modules and hence this feature is required.

Transaction: The administrator in the winery may grant rights to transactions.

Rights: Within a transaction, the rights between different users may vary. Few of them may have full control while for the rest it may be view only.

Data Bound: The right may be restricted to specific data items. For e.g. a user may be granted right to view inventory for item x and item y only. By default the right is granted on all items but may be restricted if necessary.

Reports

The administrator generates administrative reports. These reports are for administrative functions like:
A. User reports
B. Roles and access right reports The capability to generate reports based on the following dimensions has to be present:
Date range
Location
Groups
Departments 3.4.2 System Administration A section of this module will provide all the system tools to the administrator to execute all batch upload of data for the masters and tools to upload catalog data from CSV format.

Figure 5:
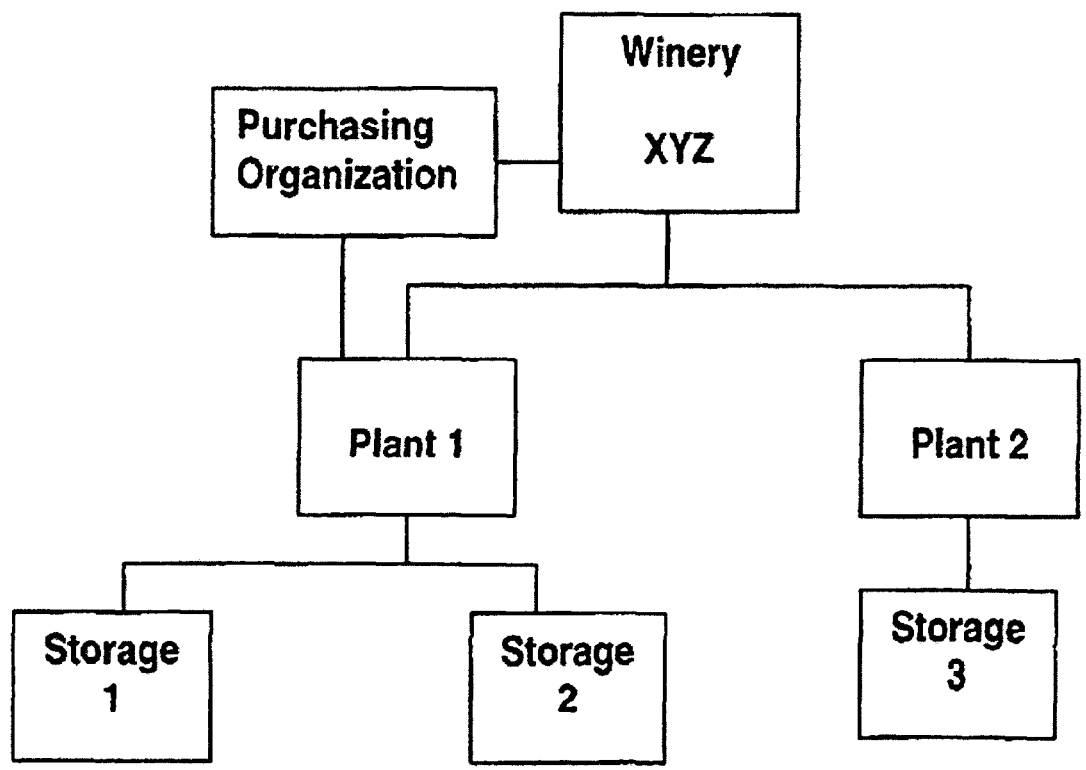
FIG. 5 is a typical structure for a winery in accordance with the prior art.

3.4.3 Organization Structure:

A typical structure for a winery is illustrated in FIG. 5. The system will be designed to capture a hierarchical organizational structure. The structure can be managed using this facility. When a new node is added to the structure, the type of the node i.e., plant, storage, purchasing organization is specified. The links between the various nodes are established using parent child relationship.

3.4.4 Item Master

The item master module contains the data and parameters that define each material used in the system for transaction.

The item master views will be classified based on General information, Purchasing Information and Storage and Inventory information. All the information specific to these views will be captured in the respective views and will be used as default values in the transaction screen of the users in the functional side. The system will have three views as of now but will be extended to many more views like sales, accounting, costing etc. when the application is scaled for more functionality.

Figure 6:
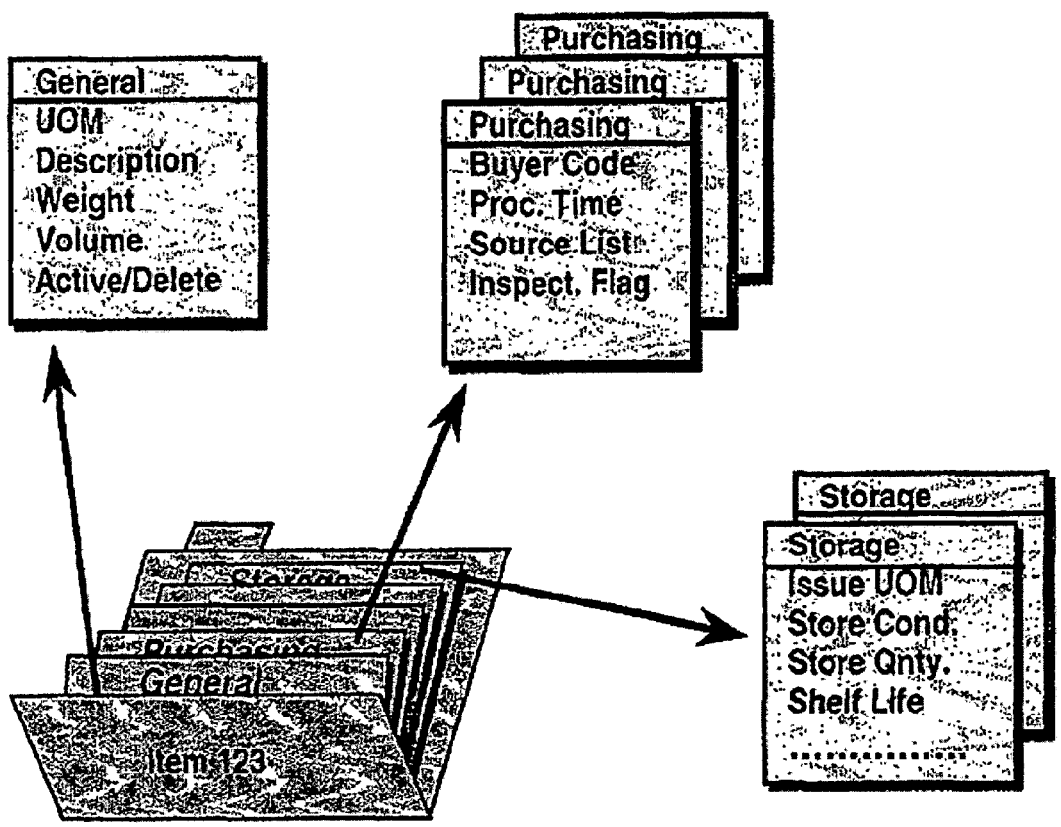
FIG. 6 is a diagrammatic representation of an item master in accordance with the present invention.

A diagrammatic representation of the item master is illustrated in FIG. 6.

1. General View: The general view will capture information like item descriptions, base unit of measure, alternate unit of measures, conversion factors for UOM, physical dimensions if applicable, weight, volume, unit of weight and volume, long text, active/delete flag, composition, item categories for catalog hierarchy, etc.

2. Purchasing View: The purchasing view will capture information like item category, procurement times, lot indicator (whether items are managed in lots), inspection flag, buyer code (person involved in procurement and is approved suppliers) etc.

3. Storage View: The storage view will capture information like issue unit of measure, physical inventory verification type, shelf life data, storage location quantities (dynamically adjusted with goods receipt and issue), storage conditions like temperature, humidity etc.

The item master module will provide features for creation, editing and marking for deletion of all items.

Reports

The capability to generate item master report based on the following dimensions has to be present:

Date range

Organization Unit (e.g, storage location)

Categories

Buyer code

3.4.5 Supplier Master

Just as a material master is required to define a material, so a supplier master is required to define a supplier. Similarly, various views will be available for a supplier master.

The supplier master view will be classified based on general information only. All the information specific to this view will be captured in the respective fields and will be used as default values in the transaction screen of the users in the functional side. The system will have one view as of now but will be extended to many more views like purchasing and accounting views, when the application is scaled for more functionality.

General View: The general view will capture information like supplier name address, telephone number, fax number, E-mail, categories and sub-categories, meta-data elements for user search in the supplier management module, and the status of the supplier as active or inactive through a flag.

Reports

The capability to generate supplier master report based on the following dimensions has to be present:

Date range

Organization Unit

Categories

4 Process Management Module

4.1 Introduction

This module will serve the winery operations user in the record keeping of their various activities and processes right from grape buying to final bottling. Record keeping of this sort will enable the audit of BATF users for records. The module will be able to capture some of the operational data which data that will help the user in 1. Tracking their processes 2. Post mortem of process parameters 3. Serve as audit records for the regulatory bodies like BATF 4. Help in generating Form 702

The process of wine making has a set of activities, which vary depending upon the type of wine being produced, Irrespective of type of wine produced, the kind of records generated during the process can be categorized into four types.

1. Activity Work Order

2. Analysis Record

3. Inventory Record

4. Tank/Barrel Record

4.2 Process Flow

Figure 7:
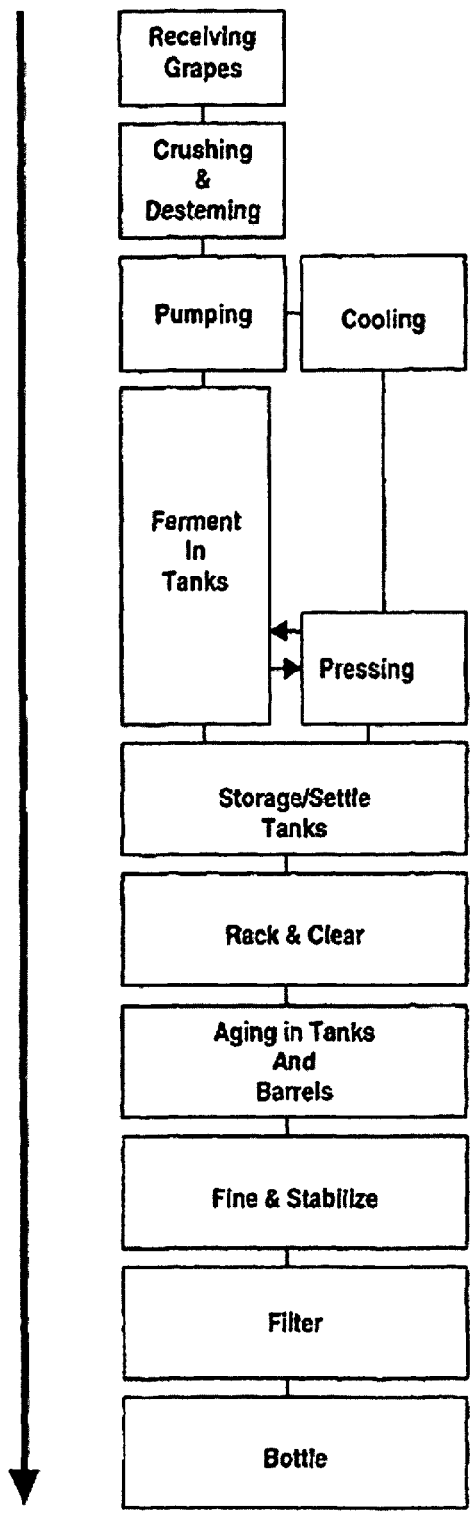
FIG. 7 illustrates the process flow of a winery and the various records generated in accordance with the prior art.

The process flow of a winery and the various records generated as illustrated in FIG. 7. The process flow outlined here is very generic and not comprehensive. It can vary based on the type of wine (Sparkling wine, Port wine etc.). Also it is expected that large wineries would have fairly complex processes.

Each of these boxes would actually be an activity in the wine making process and therefore would have a workorder associated with it. It is also expected that some lab sample analysis will be performed during some of the activities. Control records are also generated in various activities.

The module will provide the various activities to the user for entering either the work-order or the lab analysis or the process control records.

The system will provide lot traceability form bottling, backward to the variety of grapes that was inputted. This lot management functionality will uniquely identify the flow of lot through the activities in the process, thereby tying lots to the work-orders as well.

Inventory data will also be generated through records at various stages of the process.

4.3 Lot Management

The wine making process is managed in lots in order to have traceability throughout the process. Once the grapes are received, lots are created through an interface for every variation in the grapes received. Unique lot numbers will be assigned to the lot. Reference can be made to the year of harvest/procurement as well. The lots can also be further subdivided into sub-lots if the chemical analysis necessitates sub-division. A summary record for each lot is created providing details of supplier, quality, shelf life if any, the status of the lot as active/inactive and any comments associated with the lot. This document serves as the history of the lot.

As we get into each activity of the winemaking process, the work-orders record the various steps whereby the quantity of each lot getting into the activity is recorded. The process continues till the last activity in the process is reached. Here the lot finally moves out into the bottle.

In case of blending as an activity, various lots of wine come together in a tank/barrel for further processing. In such a case, a new lot number is allocated to the output for traceability.

4.4 Record Keeping

The system will be designed to provide user interfaces in the various stages of the process to record the following:

1. Activity Work-Order.

This record is generated before and during each activity in the process. This records the activity, the lot processed, the inputs to the activity, the origination of inputs, the equipment/tank number and details where the activity is being carried out etc. Each activity will be associated with a unique work order and a bottle is traced back to the receiving lot through a lot number. Each activity like Receive, Crush, Fermentation etc. will contain a workorder. The work-order will be created for a date, previous reference if any, shift etc. Each line item in the work-order represents a step in the activity with all specific details like that of lot number, location from, location to, quantity, added (+)/removed (−), and Quality.

For example, the activity of bottling 125 gallons of cabernet will be recorded in the following two steps:

Step 1: Bottle Cabernet

Lot No.: L99-1 23

Location from: Tank 400

Location to: Bldg. 1

Add/Remove: +

Quantity: 125 gals

Quality: OK

Step 2: Closure Bottle

Quantity: 52 Cases

Location from: Bldg. I

The impact of a record generation of this activity would mean increase of inventory of case goods wine by 125 gallons, reduction of 52 cases of empty bottles and reduction of in-process inventory of wine from tank 400.

Similar activity work-orders can be generated for fermentation where the individual steps could also refer addition of various grades of additives like tartaric Acid, $SO_2$ etc. Additives are added as inventory items. For an activity like "receiving grapes" the system will also capture the supplier and/or the carrier of such item. In other cases, carrier information is not required.

The system provides a feature by which a check on the inventory availability of every line item added can be done from the activity work-order. The pop-up will report the inventory on-hand, WIP etc. by weight, volume etc.

The user can also do a quick analysis for the amounts added and removed in the work-order. The variances (Removed-Added) will then be reported in weight, volume etc. for a quick review by the user before posting the work-order.

The system will also provide a feature for saving a filled out work-order as a template for re-use later. Such templates will typically be used in circumstances where an activity detail is very commonly used and therefore data entry for the user may be reduced.

2. Analysis Record.

Lab Record This record is kept as a log of analysis and evaluations are made in the winery laboratory. It is essential that the precise source, variety, weight of grapes and fruits have documentation in the winery files. BATF inspections will require this information in order to trace production output and the label statements on the resulting wine are factual. Such analysis and record keeping is done both on the arrival of grapes (Brix-Ball, pH, etc.) and also on the tank's content for various chemical parameters (ALC, TA, etc.).

Process Record: Fermentation control record is one such record, which tracks for a tank and a lot, the chemical parameters like ALC, TA etc. by date and time.

3. Inventory Record.

Record keeping for grapes in the form of weigh tag (scale ticket) and record keeping for all other bought out direct materials like additives of the wine making process, bottles, corks etc. will be supported by the system. Physical inventory verification records with respect to book inventory of all cellar materials, bulk wine and cased goods to be also performed by the users in the system.

4. Tank/Barrel Record.

Tanks and Barrels are equipment which are continuously being used in the winery for various activities like fermentation, aging, fine and stabilize etc. Maintaining the tank and barrel histories is useful not only to track capacities available but also to review the physical status of things for replacement or rectification. For example, barrels come of various kinds of wood and add a certain property to the wine when aged in it. Also the barrel's ability to transmit this property to the wine reduces with time and therefore after a certain amount of elapsed time the barrel either is disposed or it goes in for treatment. Treatment normally involves re-toasting so as to get a fresh life. System will provide a feature, which will be tracking each individual barrel or tank by its unique number and location. Records like the kind of barrell/tank, its status (empty etc.) and the activity associated with it (inspection, Top, Fill, Toast etc.) will be entered by the user for future tracking.

4.5 Reports

The system has to support a set of transactional reports:
    A. Activity Reports
    B. Lab Analysis
    C. Control Reports The capability to generate reports based on the following dimensions has to be present:
    Date range
    Location
    Tank
    Barrel
    Lots
    Category

5 Inventory Module 5.1 Introduction

This module will serve the users in searching inv status of items in various storage locations for an item. Also the user-will be able to make searches on a keyword for an item, so as to obtain the inventory status of items in various storage locations. The user can then set the threshold for items at a storage location or a combination of storage locations for generating alert to another user or group of users. The inventory data will be fed into the system through process records created in the process module.

5.2 Module Requirements

The module should have the following capabilities:

1. Select on storage location: The organizational units configured in the configuration side of the system will be represented in a drill down mode for the user to click and chose the relevant location on which he wants to check the inventory status.

2. Select on item: The items from the item master will be available to the user in a catalog format. The catalog will be a hierarchical representation with the item categories defined in the item master. The user will be able to drill down to the lowest level of the catalogue for selection of an item.

3. Search on key word: This feature will provide the user of this module a keyword search facility on some meta-data predefined in the item master. The search will display a set of items for the user to select.

4. Selection of items and/or storage locations will provide the user to see the inventory status of the item along with some predefined parameters in the item master.

5. The user should then be able to set threshold for inventory both at a single storage location and/or a combination of storage location. The user also defines the user/group of user that needs to receive the alert. As soon as the inventory status of the item falls below the threshold set-up the system should be able to generate an alert report for communication to a user/group of users as allocated by the user earlier. The message content of the alert will be predefined and the alerts will be visible to the user from the alert module on login.

6. User interfaces will enable the user to record physical verification of cellar materials, bulk wine and cased goods. The physical inventory figures will be compared with the book inventory and reconciliation will be done if authorized by the user.

5.3 Inventory Alerts inventory alerts are configured either by the user himself or by some other user who thinks that this information would be vital to the user.

inventory alerts can be configured based on the minimum and maximum stock levels of an item in one or more locations. The ability to group locations together and set alerts should be provided.

5.4 Reports

The capability to generate inventory status reports based on the following dimensions has to be present:
    Date range
    Location
    Tank
    Barrel Lots
Category

6 Supplier Module

6.1 Introduction

This module will serve the users (primarily the purchasing users) the ability to search details of suppliers based on items or on supplier themselves. The supplier module will have two distinct components namely, the supplier information and the catalog information. The supplier information would contain details of the supplier and the catalog would contain details of the items supplied. The supplier information can be used independently even if the catalog has not been updated.

1. Select a supplier: This feature will enable the user to drill down and select a specific supplier from a supplier catalogue. The catalogue will be built on certain hierarchies as category and these categories will be an input to the system in the supplier master.

2. Select on item: The items from the item catalog will be available to the user in a catalog format. The catalog will be a hierarchical representation with the item categories defined. The user will be able to drill down to the lowest level of the catalogue for selection of an item. This hierarchical organization of this catalog would be different from the organization of categories in the item master. A user interface would be required to organize and manage the categories.

3. A facility to upload supplier catalog on to the system will be provided. The catalog has to be in predefined CSV format for upload. Typical data elements that are captured are product identifier, description, image etc.

4. Search on certain data elements defined in the supplier master for items supplied by the supplier: the search will display a set of suppliers matching the search criteria. On selection of a particular supplier the user will be able to view the supplier details.

6.2 Supplier Alerts

Supplier alerts are raised based on activity that happens on the system. For example, if a new supplier is added to the system, catalog is changed then a supplier event will be raised. Some of the other events that may raise supplier alerts are:

a. Supplier related news items
   b. Location changes

When content is published using the content management module, a facility should exist to flag it as a supplier alert.

6.3 Reports

The capability to generate supplier reports based on the following dimensions has to be present:

Date range
Location
Category
Item

7 Regulations Module

7.1 Introduction

Form 702 is usually filed on a periodic basis by the wineries giving details of inventory position of the wine. Also, as per BATF requirements excise tax forms have to be filed periodically.

7.2 Module Requirements

1. Form 5120.17 (702) is usually filed in a monthly basis by the wineries giving details of inventory position of the wine. This reporting is normally done for a date range (mostly monthly) and is uniquely identified by a registration no. Part 1 of the report contains broadly two sections, bulk wines and bottled wines. Reporting of various tasks under production and use are done primarily on the categories formed by the wine's alcohol content ranges (<=14%, 14-21%, 21-24%, Artificially Carbonated and Sparkling wine). Production during Fermentation, Sweetening, Blending, Amelioration etc, and simultaneously the use of wines for testing, amelioration, topping, racking, exports etc. are key elements that are recorded. Reporting of distilled spirits, Grape material, special natural wines are done through Part II to IX of the format. Part X is reserved for comments.

2. The system will provide user interfaces for filling the data for these forms and will keep an archive of the same for future records. Any transactional data from the other modules that can be pulled up into the Form 702 will be complied with in the system.

3. Capturing of data will be done through various transactions of the process and inventory module. The system will provide a feature by which a base tally sheet for reporting will be generated containing all the data elements and the respective data computed from all transactional data captured. The user will review this base report and make ail corrections. Other entries will also be done by the user, which the system has not captured during the process transactions. Once the user has completed his review of this tally sheet with all his corrections and new entries added, he will be able to generate a report of Form 702 for submission to the BATF.

4. Also, as per BATF requirements excise tax forms (F 5000.24) have to be filed periodically. The format captures all the tax and tax related elements for the winery. The system will provide user interfaces for filling the data for these forms and will keep an archive of the same for future records.

However, the data is primarily of financial nature and cannot be generated from within the system.

7.3 Reports

The capability to generate compliance reports based on the following dimensions has to be present:

Date range
Organization unit
Registration number

8 Content Module

8.1 Introduction.

The Content Module is a standalone module with support for the following features:

1. Manage content like industry briefs, news articles and other content items

2. Provide ability to upload and share documents

The two sub-components of the Content Module have to be logically split so that either of the two can function independently.

8.2 Content Management

The following are the various kinds of content that has to be supported:

1. Industry News
2. Best Practices
3. White Papers
4. Events
5. Company News
6. Riva Commerce Information Only the top n items (configurable by user) will be displayed. The items displayed can be based on date, priority etc which is user configurable. The rest of the content items will be displayed in the archive section. When a content is uploaded a facility has to be provided to notify if it as an alert and the category to which it belongs (news alerts, supplier alerts etc.).

8.2.1 Industry News

The facility to display industry news has to be provided. It is envisaged that there would be tie-ups with content providers for providing Industry News. The integration with the content provider is expected to be through a URL link. The content resides on the content providers server and would be linked through a URL.

The facility to provide industry news is limited to the ASP model. In cases where the product is bought, the winery may subscribe to this service. If it does so, the same web page which is accessible through the ASP service would be made available to the winery. It is assumed that the users in the winery would be on the Internet so as to access the industry news web pages hosted in the ASP environment.

8.2.2 Best Practices

Riva Commerce would have in-house think tank who would publish Best Practices. The following features are required for publishing:

1. Uploading content
2. Entering meta data about the content like title, author, keywords, description etc.
3. Deleting content
4. Archiving content The content published would be available to all the subscribers in the ASP model. In case of a bought-out model, the subscribers would directly access the content from the hosted ASP environment through the Internet.

8.2.3 White Papers

Riva Commerce would have in-house think tank who would publish White Papers. The features and functionality required are same as Best Practices.

8.2.4 Events

Riva Commerce would publish the list of events applicable to the wine industry. The features and functionality required are same as Best Practices.

8.2.5 Company News

The internal news of the company can be posted here. It is visible only to the employees of that company. The right to post content on this section should reside with few individuals from the company. Some of the other features like upload, meta data, archive are same as Best Practices.

8.2.6 Riva Commerce Information

This section would contain information about Riva Commerce. This may include information related to new services, product releases etc.

This section is common and available to all companies. Some of the other features like upload, meta data, archive are same as Best Practices.

8.3 Document Sharing

The ability to share documents between users of the organization, suppliers and creative agencies (for label design) is of at most importance. This module should help share documents among the various parties. The following are the salient requirements for this module:

1. Users should have the ability to upload documents into a central repository
2. Users have to key in meta data information like keywords, description etc. The set of meta data elements gathered would be the same for all documents.
3. Users should have the ability to create a hierarchical folder within which documents would be stored.
4. When a user shares a document the folder structure is also shared. The name of the author is prefixed to the folder name to distinguish it from local folders.
5. Labels would be stored in one of the folders named "Labels"
6. Users should have the ability to grant rights to documents so that it is available only to selected users/group.
7. All documents uploaded should be stamped with author and date information.

8.4 Viewing Documents

The document can be viewed only by the owner and the user/group authorized by the owner. Access by other individuals will not be possible. The rights can be granted at the document level and not at the folder level. When a document is shared, the reference to the document is maintained. Multiple copies of the document are not created to save resources.

The documents are indexed with date and author/sender. The documents are available to the user in a drill down format from the library.

8.5 Search Documents

Users will have the ability to search documents based on meta data values. The search can be a simple search based on keywords or an advanced search based on the various meta data elements. All documents will have a standard set of meta data elements.

8.6 Reports

The content reports would contain details (meta data) of the various content uploaded onto the system.

Date range
Category
Author
Keywords

8.7 Alerts

8.7.1 News Alerts

The news items that are of interest to the user are displayed as an alert. The number of news alerts to display in the alert section is user configurable. The areas of interest of the user can be selected and alerts raised when content that matches the interest is published, the news alert can be raised when any of the content types (described in content management) are published.

8.7.2 Document Alerts

Document alerts are raised when critical documents are shared with other users/groups. When a document is shared, the ability to raise document alert has to be provided. If an alert were raised, it would be visible under document alerts.

9 Additional Requirements

Some of the additional requirements that have been envisaged but may not implemented during the initial product release are documented in this chapter.

The following are few of the additional requirements for the proposed product:

9.1. Mobile Device

One of the goals of the proposed system is to make usage of the system as simple and convenient as possible. The reason for failure of a large number of solutions existing in the market today is because of the cumbersome data entry procedures. Hence, it is envisaged that a mobile device, which can be carried into the plant, can be used as a convenience device for data gathering.

The following are the functional requirements:

1. The mobile device should have a bar code reader to scan barcodes. It is envisaged that the barrels, tanks and lots in inventory would be bar coded,
2. The barcode reader should direct the data to the standard input so that no change in the application would be required even if the keyboard is used for data input.

3. The mobile device should be a wireless device so that it can be carried to the workplace.

4. The mobile device should communicate with the system either using wireless protocols such as WAP or may be based on RF signals. The choice would be made during product consulting.

5. If WAP is used, the mobile device has to be WAP-enabled.

6. In case of RF signals, a server which would receive the transmitted signal and interface with the system is required at each of the plants. A separate application to handle communication would be required.

7. The data on the mobile device, e.g. list of tanks should be synchronized with the central system at all times. If a new tank is added then the mobile device should display the tank number in the drop down.

9.2 Adapters for Selected ERPs

In some of the large wineries, which have existing ERP systems, it may be necessary to build adapters that would facilitate integration with the proposed system. An analysis of the systems used has to be done before such and adapter can be developed. In the first phase, a CSV file has to be generated from the back end system and uploaded through a batch process.

9.3 Foreign Language Support

There has to be support in the system to support multiple languages. It is envisaged that the initial release would be in English but the subsequent release can be French.

9.4 Foreign Currency Support

The initial version of the software would support US dollars as a single currency. However, the later versions need to support multi currencies.

9.5 Floating Licenses

A floating license manager would be required to manage licenses when the product is sold to a large winery. The floating license manager should support a variety of licensing mechanisms based on users, connections and logins.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for managing a regulated industry, the system comprising:
   a processor; and
   a memory having stored therein instructions which, when executed by the processor, cause the processor to provide:
   an inventory management module tracking goods in the regulated industry;
   a process module receiving data pertaining to a plurality of stages of a manufacturing process of the regulated industry and instructions for generating an audit trail;
   a regulation module collecting information for regulations governing the regulated industry including regulatory compliance information and tax compliance information, processing data from the manufacturing process of the regulated industry and relating to the regulations governing the regulated industry, and preparing a plurality of statutory reports including compliance reports and tax reports based on the collected information for the regulations governing the regulated industry; and
   a core module, wherein the core module is coupled to the inventory management module, the process module, and the regulation module, and coordinates the operation of the modules, wherein the core module comprises a global configuration module and a functional configuration module, wherein the global configuration module allows for user assisted set up of a currency designation, a language designation, a country designation, and a state designation, and wherein the function configuration module allows for user assisted set up of a numbering range of a plurality of records, an activity in a workorder, a location, a buyer code, an item category, a tank number, a barrel number, a lot number, a composition, and a vintage.

2. The system of claim 1, wherein the data pertaining to a plurality of stages of the manufacturing process of the regulated industry is a recipe or process for making a product in accordance with regulations in the regulated industry.

3. The system of claim 1, further comprising:
   a content management module providing company-specific or supplier-specific information.

4. The system of claim 3, wherein the company-specific information or supplier-specific information is arranged in a hierarchical format.

5. The system of claim 3, wherein the company-specific information is arranged in a plurality of groups wherein access to documents in a group in said plurality of groups is only granted to select users associated with the group.

6. The system of claim 3, wherein the company-specific information is searchable based on meta data values.

7. The system of claim 1, wherein the regulated industry is the beverage industry or the wine industry.

8. The system of claim 1, wherein the regulated industry is the beer industry, the spirits industry, the soft drink industry, the oil industry, the petroleum industry, the cosmetics industry, the pharmaceutical industry, the toxic chemical industry, the nontoxic chemical industry, or the food/grocery industry.

9. The system of claim 1, wherein the work order is a recipe or process for making a product in accordance with regulations in the regulated industry.

10. The system of claim 1, wherein the activity is a receiving step, a crushing/desteming step, a fermentation step, a destemming step, a rack and clear step, a fine stabilizing step, a filtering step, or a bottling step.

11. The system of claim 1, wherein the item category has a name, description, and parent identifier.

12. The system of claim 1, wherein the buyer code is the user identifier of a person responsible for purchasing.

13. The system of claim 1, wherein the composition specifies a varietal and appellation of grapes.

14. The system of claim 1, wherein the core module comprises a functional interface that houses an item master module that comprises a plurality of views for items in a plurality of items.

15. The system of claim 14, wherein the plurality of views comprise any combination of a general view, a purchasing view, a storage view, an accounting view, and a costing view.

16. The system of claim 15, wherein the plurality of views are classified based on general information, purchasing information, storage information and inventory information.

17. The system of claim 15, wherein the general view comprises an item description, a base unit of measure, an alternate unit of measure, a physical dimension, a weight, a volume, a unit of weight, an active/inactive flag, a composition, an item category for catalog hierarchy, and/or a meta data element for user search.

18. The system of claim 15, wherein the purchasing view comprises an item category, a procurement time, a lot indicator, an inspection flag, a buyer code, a purchase comment, and/or a source list.

19. The system of claim 15, wherein the purchasing view tracks the procurement of one or more items including where each item in the one or more items originated.

20. The system of claim 19, wherein the purchasing view associates an inspection flag with each item in said one or more items.

21. The system of claim 15, wherein the storage view comprises an issue unit of measure, a physical inventory verification type, a shelf life data description, a storage location quantity, and/or a storage condition.

22. The system of claim 1, wherein the core module comprises a supplier master module that includes a general view, a purchasing view, and/or an accounting view.

23. The system of claim 22, wherein the general view comprises a supplier name, a supplier address, a supplier telephone number, a supplier FAX number, a supplier E-mail address, a category, a sub-category, a meta-data element, and/or a supplier status flag.

24. The system of claim 22, wherein the supplier master module comprises instructions for generation of a supplier master report based on any combination of a data range, an organization unit, and a category.

25. The system of claim 1, wherein the regulated industry is the wine industry and wherein the process module comprises means for generating a Bureau of Alcohol, Tobacco, and Firearms Form 702.

26. The system of claim 1, wherein the regulated industry is the wine industry and wherein the process module tracks a plurality of records, and wherein each record in the plurality of records is categorized as an activity work order, an analysis record, an inventory record, or a tank/barrel record.

27. The system of claim 26, wherein the activity work order is associated with an act of receiving grapes, an act of crushing and destemming, an act of pumping, an act of cooling, an act of fermenting in a tank, an act of pressing, an act of storage and settling in a tank, an act or racking and clearing, an act of aging in a tank or barrel, an act of stabilizing, an act of filtering, or an act of bottling.

28. The system of claim 1, wherein the regulated industry is the wine industry and wherein the process module comprises instructions for managing a wine making process associated with a plurality of lots, wherein each lot in said plurality of lots represents a variation of grapes received.

29. The system of claim 28, wherein the process module comprises instructions for assigning a unique lot number to every lot in said plurality of lots.

30. The system of claim 28, wherein the process module comprises instructions for assigning a unique sub-lot number to a portion of a lot in said plurality of lots.

31. The system of claim 28, wherein the process module comprises instructions for receiving an activity-work order, before an activity in the wine making process, that records the activity, a lot process associated with the activity, an input to the activity, an origination of the input to the activity, an identity of a piece of equipment used in the activity, and/or a detail of the activity.

32. The system of claim 31, wherein the activity is crushing and destemming, an act of pumping, an act of cooling, an act of fermenting in a tank, an act of pressing, an act of storage and settling in a tank, an act of blending, an act or racking and clearing, an act of aging in a tank or barrel, an act of stabilizing, an act of filtering, or an act of bottling.

33. The system of claim 32, wherein, when the activity is an act of blending, a new lot number is assigned to the resultant blend.

34. The system of claim 32, wherein the activity-work order comprises one or more line items selected from the group consisting of: an activity-work order name, a lot number, an origination lot number location, a destination lot number location, a quantity, an indication whether the quantity is added or removed, and a quality.

35. The system of claim 28, wherein the process module comprises instructions for constructing a summary record of a lot in said plurality of lots, wherein said summary record records any combination of a detail of a supplier of the lot, a quality of the lot, a shelf-life of the lot, and a status of the lot.

36. The system of claim 28, wherein the process module comprises instructions for maintaining a lab record of the wine making process and wherein the lab record includes a plurality of fermentation control records, wherein each fermentation control record in said plurality of fermentation control records is associated with a tank or a lot.

37. The system of claim 28, wherein the process module comprises instructions for maintaining a plurality of tank/barrel records wherein each tank/barrel record in said plurality of tank/barrel records comprises a status of a tank or barrel, wherein said status comprises one or more of a barrel/tank kind, an activity, and/or a tank/barrel property.

38. The system of claim 37, wherein said activity is a result of an inspection, a top, a fill, or a toast.

39. The system of claim 28, wherein the process module comprises instructions for creating a report as a function of a data range, a location, a tank, a barrel, a lot, or a category.

40. The system of claim 1, wherein the inventory management module comprises instructions for searching by a storage location, an item, a key word for an item, a combination of storage locations, or an item category.

41. The system of claim 1, wherein the inventory management module comprises:
   instructions for defining a group;
   instructions for defining an alert for an item, wherein said alert is fired when an inventory status of the item falls below a predetermined level; and
   instructions for notifying said group when said alert is fired.

42. The system of claim 1, wherein the inventory management module comprises:
   instructions for defining a group;
   instructions for defining an alert for an item, wherein said alert is fired when an inventory status of the item exceeds a predetermined level; and
   instructions for notifying said group when said alert is fired.

43. The system of claim 1, wherein the regulated industry is the wine industry and wherein the inventory module comprises a user interface that enables a user to record physical verification of cellar materials, bulk wine or cased goods.

44. The system of claim 1, wherein the inventory module comprises instructions for reconciling a physical inventory with a book inventory.

45. The system of claim 1, tracking goods in the regulated industry comprise tracking receipt of goods, issue of goods, movement of goods, and verification of goods location.

46. The system of claim 1, further comprising a supplier module providing information about a plurality of suppliers and items provided by each supplier in the plurality of suppliers.

47. The system of claim 46, wherein the supplier module comprises instructions for searching by supplier and instructions for searching by item.

48. The system of claim 46, wherein the supplier module comprises instructions for uploading a supplier catalog that includes, for each respective product in a plurality of products, a product identifier, a product description, and/or a product range.

49. The system of claim 46, wherein the supplier module comprises:
instructions for receiving a query for an item; and
instructions for providing details of each supplier in the plurality of suppliers that sells said item.

50. The system of claim 1, wherein the regulation module prepares a form 5120.17 based on transactions tracked by the process module and the inventory module.

51. The system of claim 1, wherein the system is provided to a customer under a license model or an application service provider model.

52. The system of claim 1, wherein the system supports a Secure Socket Layer.

53. The system of claim 1, wherein the system is maintained on a web server and is accessed through a web browser on a remote computer.

54. A computer readable storage medium having stored thereon a series of instructions which, when executed by a processor, cause the processor to provide a mechanism for managing an unregulated industry by executing:
an inventory management module tracking goods in a regulated industry;
a process module receiving data pertaining to a plurality of stages of a manufacturing process of the regulated industry and instructions for generating an audit trail;
a regulation module collecting information for regulations governing the regulated industry including regulatory compliance information and tax compliance information, processing data from the manufacturing process of the regulated industry and relating to the regulations governing the regulated industry, and preparing a plurality of statutory reports including compliance reports and tax reports based on the collected information for the regulations governing the regulated industry; and
a core module, wherein the core module is coupled to the inventory management module, the process module, and the regulation module, and coordinates the operation of the modules, wherein the core module comprises a global configuration module and a functional configuration module, wherein the global configuration module allows for user assisted set up of a currency designation, a language designation, a country designation, and a state designation, and wherein the function configuration module allows for user assisted set up of a numbering range of a plurality of records, an activity in a workorder, a location, a buyer code, an item category, a tank number, a barrel number, a lot number, a composition, and a vintage.

55. The computer readable storage medium of claim 54, wherein the data pertaining to a plurality of stages of the manufacturing process of the regulated industry is a recipe or process for making a product in accordance with regulations in the regulated industry.

56. The computer readable storage medium of claim 54, wherein the processor further provides:
a content management module, wherein the content management module comprises instructions for providing company-specific or supplier-specific information.

57. The computer program product of claim 56, wherein the company-specific information or supplier-specific information is arranged in a hierarchical format.

58. The computer program product of claim 56, wherein the company-specific information is arranged in a plurality of groups wherein access to documents in a group in said plurality of groups is only granted to select users associated with the group.

59. The computer readable storage medium of claim 56, wherein the company-specific information is searchable based on meta data values.

60. The computer program product of claim 54, wherein the regulated industry is the beverage industry or the wine industry.

61. The computer program product of claim 54, wherein the regulated industry is the beer industry, the spirits industry, the soft drink industry, the oil industry, the petroleum industry, the cosmetics industry, the pharmaceutical industry, the toxic chemical industry, the nontoxic chemical industry, or the food/grocery industry.

62. The computer readable storage medium of claim 54, wherein the work order is a recipe or process for making a product in accordance with regulations in the regulated industry.

63. The computer readable storage medium of claim 54, wherein the activity is a receiving step, a crushing/desteming step, a fermentation step, a desteming step, a rack and clear step, a fine stabilizing step, a filtering step, or a bottling step.

64. The computer program product of claim 54, wherein the regulated industry is the wine industry and wherein the process module comprises means for generating a Bureau of Alcohol, Tobacco, and Firearms Form 702.

65. The computer program product of claim 54, wherein the regulated industry is the wine industry and wherein the process module tracks a plurality of records, and wherein each record in the plurality of records is categorized as an activity work order, an analysis record, an inventory record, or a tank/barrel record.

66. The computer program product of claim 65, wherein the activity work order is associated with an act of receiving grapes, an act of crushing and desteming, an act of pumping, an act of cooling, an act of fermenting in a tank, an act of pressing, an act of storage and settling in a tank, an act or racking and clearing, an act of aging in a tank or barrel, an act of stabilizing, an act of filtering, or an act of bottling.

67. The computer program product of claim 54, wherein the regulated industry is the wine industry and wherein the process module comprises instructions for managing a wine making process associated with a plurality of lots, wherein each lot in said plurality of lots represents a variation of grapes received.

68. The computer program product of claim 67, wherein the process module comprises instructions for assigning a unique lot number to every lot in said plurality of lots.

69. The computer program product of claim 67, wherein the process module comprises instructions for assigning a unique sub-lot number to a portion of a lot in said plurality of lots.

70. The computer program product of claim 67, wherein the process module comprises instructions for receiving an activity-work order, before an activity in the wine making process, that records the activity, a lot process associated with the activity, an input to the activity, an origination of the input to the activity, an identity of a piece of equipment used in the activity, and/or a detail of the activity.

71. The computer program product of claim 70, wherein the activity is crushing and desteming, an act of pumping, an act of cooling, an act of fermenting in a tank, an act of pressing, an act of storage and settling in a tank, an act of blending, an act or racking and clearing, an act of aging in a tank or barrel, an act of stabilizing, an act of filtering, or an act of bottling.

72. The computer program product of claim 54, wherein the inventory management module comprises instructions for searching by a storage location, an item, or a key word.

73. The computer program product of claim 54, wherein the inventory management module comprises:
    instructions for defining a group;
    instructions for defining an alert for an item, wherein said alert is fired when an inventory status of the item falls below a predetermined level; and
    instructions for notifying said group when said alert is fired.

74. The computer program product of claim 54, wherein the inventory management module comprises:
    instructions for defining a group;
    instructions for defining an alert for an item, wherein said alert is fired when an inventory status of the item exceeds a predetermined level; and
    instructions for notifying said group when said alert is fired.

75. The computer readable storage medium of claim 54, wherein the regulated industry is the wine industry and wherein the inventory module comprises a user interface that enables a user to record physical verification of cellar materials, bulk wine or cased goods.

76. The computer program product of claim 54, wherein the inventory module comprises instructions for reconciling a physical inventory with a book inventory.

77. The computer readable storage medium of claim 54, wherein tracking goods in the regulated industry comprises tracking issue of goods, movement of goods, and verification of goods location.

78. The computer readable storage medium of claim 54, wherein the processor further executes a supplier module providing information about a plurality of suppliers and items provided by each supplier in the plurality of suppliers.

79. The computer program product of claim 78, wherein the supplier module comprises instructions for searching by supplier and instructions for searching by item.

80. The computer readable storage medium of claim 54, wherein the regulation module prepares a form 5120.17 based on transactions tracked by the process module and the inventory module.

81. The computer program product readable storage of claim 54, wherein data can be entered by a mobile device that has a bar code reader.

82. The computer readable storage of claim 54, wherein the processor further executes a floating license manager that comprises instructions for maintaining one or more licenses to the inventory management module, the process module, the regulation module and/or the core module.

83. The computer program product of claim 54, wherein the regulated industry is the wine industry, the beer industry, the spirits industry, the soft drink industry, the oil industry, the petroleum industry, the cosmetics industry, the pharmaceutical industry, the toxic chemical industry, the nontoxic chemical industry, or the food/grocery industry.

84. The computer readable storage of claim 54, wherein the mechanism is provided to a customer under a license model or an application service provider model.

85. The computer readable storage of claim 54, wherein the mechanism supports a Secure Socket Layer.

86. The computer readable storage of claim 54, wherein the mechanism is maintained on a web server and is accessed through a web browser on a remote computer.

87. The system of claim 1, wherein the data pertaining to the plurality of stages of the manufacturing process of the regulated industry includes lab analysis data.

88. The system of claim 1, wherein the core module further provides user management, role and security management, organization structure management, system administration, and alert functions.

89. The system of claim 1, wherein coordinating the operation of the modules comprises tracking the data pertaining to the plurality of stages of the manufacturing process across the plurality of stages of the manufacturing process.

* * * * *

UNITED STATES PATENT AND TRADEMARK OFFICE
CERTIFICATE OF CORRECTION

| | |
|---|---|
| PATENT NO. | : 7,925,550 B2 |
| APPLICATION NO. | : 10/914538 |
| DATED | : April 12, 2011 |
| INVENTOR(S) | : Kataria et al. |

It is certified that error appears in the above-identified patent and that said Letters Patent is hereby corrected as shown below:

References Cited

On page 2, in column 2, under "Other Publications", line 4, delete "Pulications" and insert -- Publications --, therefor.

In the Specification

In column 10, line 42, delete "CrushingiDesteming," and insert -- Crushing/Desteming, --, therefor.

In column 11, line 6, delete "Cabemet" and insert -- Cabernet --, therefor.

In column 11, line 64, delete "inventory" and insert -- Inventory --, therefor.

In column 11, line 65, delete "inventory" and insert -- Inventory --, therefor.

In column 11, line 67, delete "inventory" and insert -- Inventory --, therefor.

In column 15, line 20, delete "Lab Record" and insert -- Lab Record: --, therefor.

In the Claims

In column 23, line 41, in claim 27, delete "an act or racking" and insert -- an act of racking --, therefor.

In column 23, line 65, in claim 32, delete "an act or racking" and insert -- an act of racking --, therefor.

In column 25, line 8, in claim 48, delete "range." and insert -- image. --, therefor.

In column 26, line 17, in claim 61, after "industry," delete "the soft drink industry,".

Signed and Sealed this
Sixth Day of October, 2015

Michelle K. Lee
*Director of the United States Patent and Trademark Office*

CERTIFICATE OF CORRECTION (continued)
U.S. Pat. No. 7,925,550 B2

In column 26, line 31, in claim 64, delete "means" and insert -- instructions --, therefor.

In column 26, line 43-44, in claim 66, delete "an act or racking" and insert -- an act of racking --, therefor.

In column 27, line 3, in claim 71, delete "an act or racking" and insert -- an act of racking --, therefor.